June 6, 1944. A. KRÜSSMANN 2,350,776
DEVICE FOR CONVERTING A CONTROLLING IMPULSE INTO
AN ALTERNATING CURRENT IMPULSE
Filed Sept. 5, 1939 2 Sheets-Sheet 2
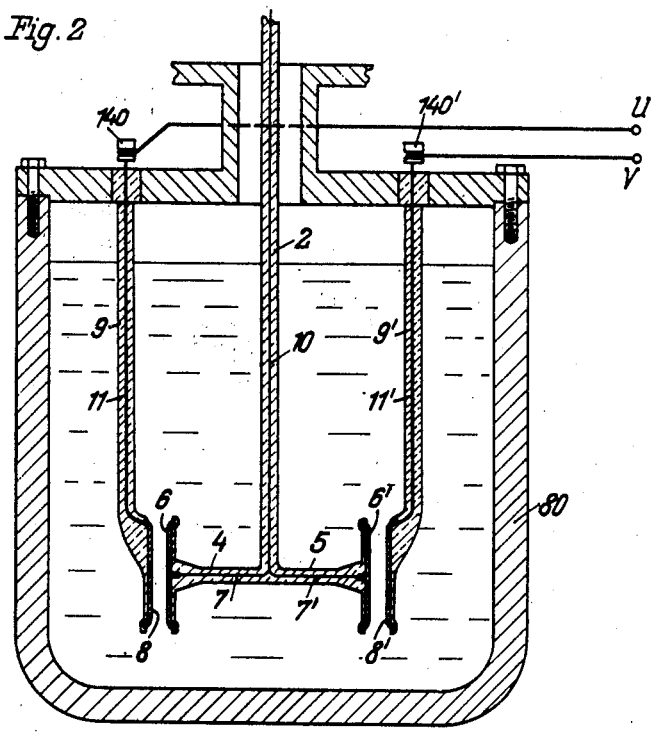
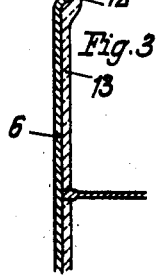
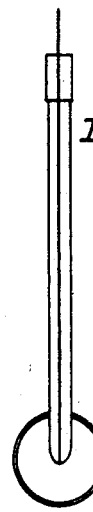
Inventor:
Adolf Krüßmann
By A.D.Adams
Attorney Patented June 6, 1944

2,350,776

UNITED STATES PATENT OFFICE 2,350,776

DEVICE FOR CONVERTING A CONTROLLING IMPULSE INTO AN ALTERNATING CURRENT IMPULSE

Adolf Krüssmann, Berlin-Friedenau, Germany; vested in the Alien Property Custodian Application September 5, 1939, Serial No. 293,523

3 Claims. (Cl. 201—57)

The invention relates to improvements in devices in which an auxiliary force is controlled by measuring or regulating impulses for obtaining corresponding impulses of the auxiliary force. In particular the invention refers to devices of the kind in which a controlling impulse is to be converted into an electric current impulse. Such devices are specially suitable for controlling a physical condition, as for instance a temperature, a pressure, a quantity of a flowing medium, or for remote-transmission of a controlling impulse, such as a measuring or regulating impulse, as in such cases it is often necessary to adjust a controlled member, for instance an electric motor, in dependence on a controlling impulse.

The first object of the invention is to render the device suitable for converting even small impulses of any kind into considerably amplified electric A. C. impulses with a view to dispensing with additional current amplifying means. Furthermore the invention relates to the construction of the device so as to increase its reliability during operation and the accuracy of the measurement over the entire measuring range.

A further aim of the invention is to avoid in the device any reacting force prejudicially affecting the accuracy of the conversion of the controlling impulse.

The invention is more fully explained with reference to the accompanying drawings, of which Fig. 1 shows an embodiment of the invention in which the device is designed for regulating purposes;

Fig. 2 shows a part of the device according to the invention in vertical section and in approximately natural size;

Fig. 3 represents a detail of the arrangement of Fig. 2 in cross section and on enlarged scale;

Figs. 4 and 5 show a further detail of the arrangement according to and on the same scale as Fig. 2 in two aspects, one representing a front view and one a cross section.

Figure 1:
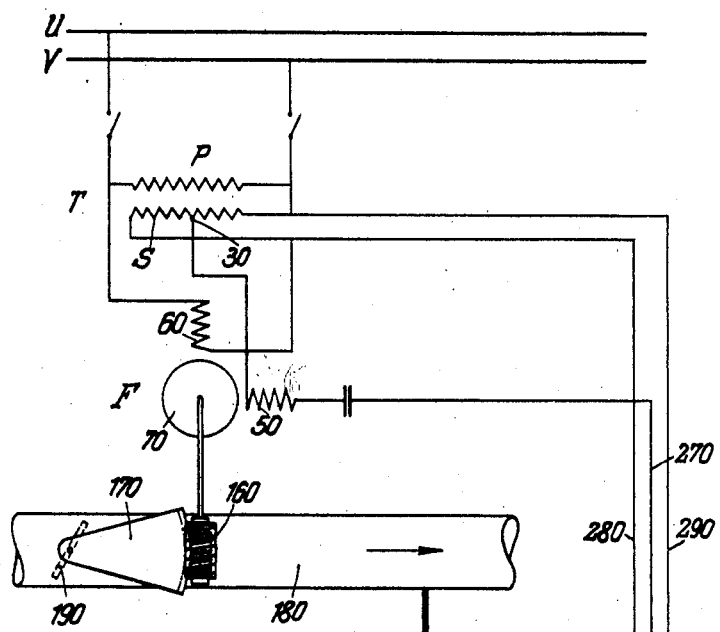
Figure 1:
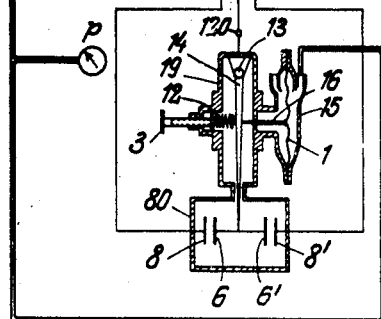

Fig. 1 shows diagrammatically an arrangement for maintaining a constant pressure in the conduit 180 by means of the throttle 190. $p$ stands for controlled pressure behind the throttle 190. A pressure responsive means 15 having a diaphragm 1 acted upon by the pressure $p$ is secured to the relay casing 19. The motion of this diaphragm is transmitted by means of a pin 16 to a lever 14 which is mounted in the casing 19 for movement around the axle 13. A spring 12 counteracts the pressure $p$, the counteracting force of the spring being adjustable by means of a manipulated screw 3 screwed into the casing 19. The lower part of the relay casing 19 is constructed as a vessel 80 filled with an electrolyte. The lever 14 carries at its lower end two electrode plates 6, 6' being electrically connected to and remote from one another. These electrodes are electrically connected, by means of a conductor in the interior of the lever 14, to a terminal 120. Each of the electrodes 6, 6' faces one of two outer electrodes 8, 8' which are rigidly connected to the wall of the vessel 80. The four electrodes are arranged in such a manner that the center electrodes 6, 6' may be moved relative to the outer electrodes 8, 8' in two opposite directions. The outer electrodes 8, 8' are connected by wires 280, 290 parallel to the center tapped secondary winding S of a transformer T, the primary winding P of which is fed by the A. C. power source U, V. For the purpose of adjusting the throttle 190, a Ferraris motor F is provided. The Ferraris motor conventionally has two magnetic exciting field windings 50, 60 arranged vertically to each other. The winding 50 of the Ferraris motor is connected by a wire 270 between the terminal 120 of the center electrodes 6, 6' and the center tap 30 of the secondary transformer winding S. In this arrangement the device 80, 6, 6', 8, 8' acts as a potentiometer. The other winding 60 of the Ferraris motor is directly connected to the A. C. circuit U, V. The rotor 70 of the Ferraris motor F moves a worm 160 which engages a worm wheel segment 170 connected to the throttle, a movement of the worm 160 causing a movement of the segment 170 and consequently a movement of the throttle 190.

The spring 12 is so adjusted that the center electrodes 6, 6' have at a certain pressure approximately the same distance with respect to the outer electrodes 8, 8', i. e. zero potential. In this case the voltages between each of the electrodes 6, 6' and each of the corresponding outer electrodes 8, 8', respectively, are equal, so that no current flows through the exciting winding 50 of the Ferraris motor. As soon as the pressure changes, the lever 14 is displaced to the left or right and therefore a voltage is produced between the center electrodes 6, 6' and the center tap 30 of the transformer T, the amount and phase of which corresponds to the amount and direction of the displacement of the lever from its initial position. In consequence thereof a current flows through the winding 50, the intensity and the phase of this current determining the rate and direction of the movement of the Ferraris motor. If the pressure at 15 is too large, the throttle 190 is moved by the Ferraris motor towards its closing position or vice versa.

The construction of the vessel containing the electrodes is more fully explained with reference to Figs. 2–5. As shown in Fig. 2, a supporting rod 2 of insulating material, preferably glass, is connected to the free movable end of the lever 14. The supporting rod 2, into which a conducting wire 10 is fused, possesses at its lower end two lateral extensions 4, 5 of glass, each of which encloses a conducting wire 7, 7', respectively, which are connected to the conducting wire 10. The lateral ends of the conducting wires 7, 7' carry the electrode plates 6, 6', said electrode plates 6, 6' forming together the center electrode. Each of the electrodes 6, 6' at a distance of about 3 mm. faces one of the respective outer electrodes 8, 8' which are carried by the glass supporting members 9, 9' rigidly secured to the walls of the vessel 80. Two conducting wires 11, 11' fused into the glass supporting members 9, 9' are connected to the electrodes 8, 8', respectively, on the one hand and on the other hand to the terminals 140, 140', respectively, on the walls of the vessel 80, while the conductor 10 of the center electrodes 6, 6' is connected to the terminal 120 (Fig. 1). All electrodes are insulated on the back sides and at the edges, as may be seen in particular from the representation in Fig. 3 showing the mode of insulation of one of the center electrodes (6). The edge 12 of the electrode 6 is bent backwards. 13 represents a glass layer at the back of the electrode, which layer also encloses the edge 12. Figs. 4 and 5 show one of the fixedly mounted electrodes 8, 8'. This arrangement has the advantage that the A. C. power may be controlled practically free from an undesired reacting force, as the displacement of the movable electrodes is very small and friction between contacts non-existent. The device may be controlled by any kind of mechanical impulse; such mechanical impulses may likewise be derived by way of conversion of an electrical impulse shifting the movable electrodes of the liquid resistance, for example by electro-magnetic means. By constructing the center electrodes of two electrically connected remote parts 6, 6', each facing a fixed electrode 8, 8', respectively, a considerable reduction of waste current between the two outer electrodes is achieved. In addition, the inevitable heat production is distributed over two places separated in space which favors the heat exchange in the surrounding liquid.

By insulating the reverse sides of the electrode plates it is ensured that the current flows only between the immediately juxtaposed surfaces of outer and center electrodes and no current is produced between the reverse sides of the opposed electrodes. The insulation of the electrode edges prevents a higher current density at these places than between the electrodes immediately facing each other. Thus the current flows only between the facing electrode surfaces with approximately the same current density. Consequently the steepness of the characteristic of the relay, i. e. the dependence of the controlled current fed by the center electrode on its displacement of the latter, is enhanced, which is of great importance for the operation of the relay. The insulating glass layer is fused on to the electrodes which latter are advantageously made of platinum black.

What is claimed is:

1. A liquid rheostat comprising a container of insulating material, electrode means comprising rods of insulating material having conductors embedded therein and the rods terminating in opposed disks of said material and conducting electrode plates carried on the opposed surfaces of said disks, and in contact respectively with said conductors, the edges of each plate being bent away from the opposite plate and embedded in said insulating material.

2. A liquid rheostat comprising a container of insulating material, two stationary electrode means comprising rods of insulating material having conductors embedded therein and terminating in flat disks facing one another and conducting plates in facial contact with and supported by said disks and connected respectively to said conductors and a movable electrode means between said two stationary means, said movable means comprising a rod of insulating material of inverted T-shape and formed at the ends of the cross of the T with disks adjacent to and facing, respectively, said first named disks, a conductor embedded in said last named rod and conducting plates in facial contact with and carried respectively by said last named disks and connected to said conductor.

3. The rheostat as set forth in claim 2 wherein the edges of the disk are embedded in the insulating material.

ADOLF KRÜSSMANN.